United States Patent Office 3,423,472
Patented Jan. 21, 1969

3,423,472
PROCESS FOR THE SELECTIVE HYDROGENA-
TION OF PHENYLPHENOLS
Paul N. Rylander and Duane R. Steele, Newark, N.J., as-
signors to Engelhard Industries, Inc., Newark, N.J., a
corporation of Delaware
No Drawing. Filed Oct. 28, 1964, Ser. No. 407,253
U.S. Cl. 260—619                                2 Claims
Int. Cl. C07c 35/10

This invention relates to a selective hydrogenation process and more particularly to a process for the selective hydrogenation of phenylphenols and biphenyl-lower alkyl ethers wherein the selectivity resides in the hydrogenative saturation of one aromatic ring only of the bicyclic aromatic compound.

In accordance with the present invention, a new and valuable process is provided for the selective or substantially selective hydrogenation of one aromatic ring only of a bicyclic aromatic compound selected from those having the formula

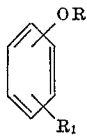

wherein R is from the group consisting of a hydrogen atom and lower alkyl radicals, i.e. straight or branched chain 1–4C alkyl, and $R_1$ is the phenyl radical. The process comprises subjecting the selected bicyclic aromatic compound while in solution in an organic liquid solvent which favors the selective hydrogenation of one aromatic ring only of the compound as hereinafter defined, to reaction with molecular hydrogen in the presence of a palladium catalyst at a reaction temperature and pressure until sufficient hydrogen is taken up to saturate one aromatic ring of the compound. The reaction product thereby obtained comprises predominantly or principally the corresponding partially hydrogenated compound from the group consisting of those having the formula

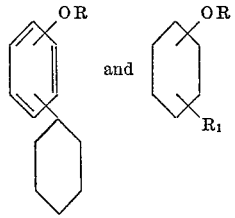

wherein R and $R_1$ have the meaning previously stated herein. The process attained good yields of the selectively saturated compound and especially high yields of the selectively saturated compound, p-cyclohexylphenol. The $R_1$ phenyl radical can be unsubstituted or substituents such as alkyl or alkoxy, for instance 1–4C straight or branched chain alkyl or alkoxy groups, can be present in the $R_1$ phenyl radical without interfering with the hydrogenation.

It is essential for the success of the selective hydrogenation of this invention that there be utilized (a) a palladium catalyst, and (b) the organic solvent favoring or conducive to the hydrogenation of one aromatic ring only of the bicyclic aromatic compound to be hydrogenated.. The good results achieved by the combination of the palladium catalyst and organic liquid solvent of this invention were unexpected and surprising, inasmuch as the use of rhodium and ruthenium separately as catalyst with such organic liquid solvent resulting in a non-selective hydrogenation of p-phenylphenol to obtain considerable quantities of product having both aromatic rings saturated.

Further the use of Pt, Rh, Ru or Ir as catalyst with the organic solvent herein gave inferior and unsatisactory results in the hydrogenation, from the standpoint of either too low a yield of the desired product or no desired product whatsoever having only one aromatic ring saturated in the case of Ru and Ir. And such unsatisfactory results occurred even when an organic liquid solvent of this invention favoring the selective hydrogenation of one aromatic ring only when Pd was the catalyst, was used with the Pt, Rh, Ru or Ir as catalyst. Use of isopropyl alcohol or aqueous sodium hydroxide as diluent and palladium as catalyst in the process gave unsatisfactory results due to too low a yield of the desired product having one aromatic ring only saturated.

Organic liquid solvents favoring or conducive to the hydrogenation of one aromatic ring only of the bicyclic aromatic compound are for example, straight or branched chain saturated aliphatic hydrocarbon monocarboxylic acids having from 2–10 carbon atoms inclusive per molecule, e.g the alkanoic acids such as acetic acid, propionic acid, n-butyric acid, n-valeric acid, n-caproic acid, isobutyric acid, caprylic acid, n-heptoic acid, decanoic acid, n-nonylic acid; and normally liquid straight or branched chain or cyclic paraffinic hydrocarbons having from 5–12 carbon atoms inclusive per molecule, e.g. cyclohexane, methylcyclohexane, n-pentane, isopentane, heptane, n-hexane, n-octane, isooctane, nonane, n-decane, isodecane, 3-methylpentane, undecane, n-dodecane, cyclopentane, cycloheptane, cyclooctane and cyclononane. The acetic acid and cyclohexane are preferred solvents and an acetic acid water mixture is an espeically preferred solvent. The water is usually present in such mixture in amount of about 15–50 weight percent (based on weight of acid plus water). Depending on the particular solvent utilized, the process of this invention is especially versatile from the standpoint of either selectively or substantially selectively saturating the $R_1$ phenyl ring only where employing a solvent of this invention favoring or conducive to the hydrogenative saturation of such phenyl ring, or selectively or substantially selectively saturating only the aromatic ring

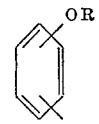

when employing another solvent of this invention. A solvent of this invention favoring the hydrogenative saturation of the $R_1$ phenyl ring only of the bicyclic aromatic compound is, for example, a saturated aliphatic hydrocarbon monocarboxylic acid having from 2–10 carbons per molecule previously disclosed herein. A solvent favoring the hydrogenative saturation of only the aromatic ring

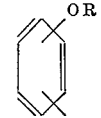

of the bicyclic aromatic compound is exemplified by a normally liquid saturated straight or branched chain or cyclic paraffin or alkane hydrocarbon having from 5–12 carbons per molecule previously set forth herein.

The term "organic liquid solvent which favors hydrogenative saturation of one aromatic ring only of the compound," i.e., the bicyclic aromatic compound to be hydrogenated, is used herein to mean or designate a certain normally liquid organic solvent, for instance one of the organic liquid solvents previously disclosed herein, which when utilized as a solvent for the particular bicyclic aromatic compound to be hydrogenated in the presence of the palladium catalyst, results predominantly or principally in one aromatic ring only of the bicyclic compound being saturated by taking up 3 moles of hydrogen. The term "solvent is one favoring the hydrogenative saturation of the $R_1$ phenyl ring" of the compound of formula

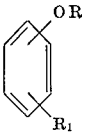

previously disclosed herein is used in appended claims to designate a certain normally liquid organic solvent, for instance one of the saturated aliphatic hydrocarbon monocarboxylic acids previously disclosed herein, which when utilized as a solvent for the particular bicyclic aromatic compound to be hydrogenated in the presence of the palladium catalyst, results predominantly or principally in only the $R_1$ phenyl ring of such compound being saturated by taking up 3 moles of hydrogen. The term "solvent is one favoring the hydrogenative saturation of the aromatic ring"

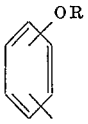

of the compound of formula previously set forth herein is used in the appended claims to designate a certain normally liquid organic solvent, for instance one of the straight or branched chain or cyclic paraffinic hydrocarbons previously disclosed herein, which when employed as solvent for the particular bicyclic aromatic compound to be hydrogenated in the presence of the palladium catalyst, results predominantly or principally in the aromatic ring

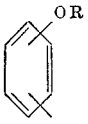

being saturated by taking up 3 moles of hydrogen.

The solvent is utilized herein in amount typically within the weight ratio range of about 3:1 to 7:1 of solvent to the phenylphenol or biphenol-lower alkyl ether respectively.

Compounds that can be hydrogenated in accordance with this invention are, for example, o-, m- or p-phenylphenols, biphenyl-methyl ethers, biphenylpropyl ethers, biphenyl-ethyl ethers, biphenyl-butyl ethers, biphenyl-isopropyl ethers, biphenyl-isobutyl ethers and biphenyl-t-butyl ethers.

The product obtained in predominance when the solvent favors the saturation of the $R_1$ phenyl ring only is the corresponding cyclohexylphenol in the case of the phenylphenol as starting material, and the corresponding cyclohexylphenyl-lower alkyl ether when the biphenyl-lower alkyl ether is the material to be selectively hydrogenated. When the solvent is one favoring the saturation of only the phenyl ring directly linked to the ether or hydroxy oxygen as the case may be, the product obtained in predominance when the phenylphenol is the material hydrogenated is the corresponding phenyl cyclohexanol, and the corresponding phenylcyclohexane-lower alkyl ether when the biphenyl-lower alkyl ether is the material hydrogenated.

The palladium catalyst herein can be unsupported or supported, but preferably is supported on a solid catalyst carrier, for instance carbon, alumina, kieselguhr, barium sulfate or silica. The supported Pd catalyst can be prepared by immersing or otherwise treating the carrier particles, which may be spheres, granules, extrudate, etc., in an aqueous solution of a water-soluble compound of the palladium, for instance palladium chloride, followed by reducing the palladium compound on the carrier to palladium metal by contact with a stream of a reducing gas, for instance hydrogen, at elevated temperature. The catalytic metal is usually present in the supported catalyst in amount, by weight, from about 0.1%–10%, preferably about 1%–5% (based on total supported catalyst).

The hydrogenation of this invention is carried out at a temperature in the range preferably from about 50° C.–200° C., more preferably from about 75° C.–150° C.; and a pressure in the range preferably from about 300–5000 p.s.i.g., more preferably from about 500–1500 p.s.i.g. A pressure sufficient to maintain the liquid phase in the reaction mixture is preferably employed when relatively high reaction temperatures are employed.

In effecting the hydrogenating, a hydrogen-containing gas, for instance $H_2$ per se, passed into the liquid mass of bicyclic aromatic compound in solution in the organic liquid solvent and containing the solid palladium catalyst particles therein in a suitable reactor until sufficient hydrogen is taken up, i.e., reacted, to saturate one aromatic ring of the bicyclic aromatic. The reaction time for saturating one ring of the bicyclic aromatic in accordance with this invention is typically about 15–300 minutes, such time varying with different reaction conditions of pressure and temperature. In general, with higher pressures and higher temperatures, the reaction time is less than with lower pressures and temperatures. The product bicyclic compound having one ring only saturated is then separated from the liquid reaction product mass containing predominantly such product by fractional distillation or by extraction. The separated product can then be upgraded in purity by chromatography or where suitable by fractional crystallization.

The invention will be more fully understood by reference to the following examples. Parts and percentages are by weight unless otherwise specified.

Example I p-Phenylphenol mixed together in amount of 10 parts with 50 parts by volume of an organic solvent therefor was hydrogenated at a temperature of 110°–120° C. and a pressure of 1000 p.s.i.g. in the presence of 1.2 parts of a supported platinum group metal catalyst. A number of hydrogenation runs were carried out under similar conditions and with the particular catalyst and solvent for the phenylphenol hereinafter set forth in the table of data. The results of such runs are set forth in the table which follows:

| Test run No. | Catalyst | Solvent | Product | |
|---|---|---|---|---|
| | | | p-Cyclohexylphenol (mole percent) | 4-phenyl cyclohexanol (mole percent) |
| 1 | 5% Pd/C | Acetic acid | 90 | <10 |
| 2 | 5% Pd/C | Cyclohexane | 35 | 53 |
| 3 | 5% Pd/C | do | 17 | 59 |
| 4 | 5% Pd/C | do | 26 | 72 |
| 5 | 5% Pt/C | Acetic acid | 10 | 4 |
| 6 | 5% Pt/C | Cyclohexane | 24 | 17 |
| 7 | 5% Rh/C | do | 27 | 24 |
| 8 | 5% Rh/C | Aqueous NaOH | 39 | 19 |
| 9 | 5% Ru/C | do | 0 | 0 |
| 10 | 5% Ir/C | Cyclohexane | 0 | 0 |

The test data of the table show that the combination of the palladium catalyst and the acetic acid (Test Run 1) or cyclohexane (Text Runs 2, 3 and 4) as solvent resulted in a product hydrogenate containing a considerably greater amount of a selectively hydrogenated product, i.e. having one aromatic ring only saturated, than the remaining test runs wherein another platinum group metal was employed as catalyst either with the same or a different solvent. The acetic acid solvent of Test Run 1 favored the hydrogenative saturation of the phenyl ring only, while the cyclohexane solvent of Runs 2, 3 and 4 favored the hydrogenative saturation of the phenol ring only. The Ir catalyst and cyclohexane solvent of Test Run 10 resulted in no p-cyclohexylphenol and no 4-phenylcyclohexanol being produced. Run 9 employing a Ru catalyst and aqueous NaOH as solvent resulted in no p-cyclohexylphenol or 4-phenylcyclohexanol being produced. The acetic acid of Runs 1 and 5 contained 16% by weight of water (based on acid plus water), and the aqueous NaOH of Runs 8 and 9 contained 96% by weight of water (based on NaOH plus water). The percentage of platinum group metal in the supported catalyst of the test runs of the table is by weight and based on the total supported catalyst.

The phenylphenols hydrogenated herein are obtainable in commerce. The biphenyl-lower alkyl ethers can be prepared by admixing the particular phenylphenol with aqueous sodium hydroxide solution to obtain the sodium salt of the phenylphenol, and reacting the sodium salt of the phenylphenol with the corresponding alkyl halide, for instance methyl bromide, ethyl bromide, propyl bromide or butyl bromide, with the application of heat to the reaction mixture.

Product partially hydrogenated phenylphenols obtained by this invention have utility as stabilizers and antioxidants for organic materials, and also for the production of materials useful in the production of polymers. Thus the cyclohexylphenols are utilized as antioxidants for elastomers, fuels and lubricants including various gasolines, diesel fuel and high pressure lubricants as well as for automatic transmission fluid. The phenylcyclohexanols are useful for the synthesis of phenylcaprolactams which in turn have utility for the production of polymers. Product partially hydrogenated biphenyl-lower alkyl ethers obtained by this invention are useful as solvents for high molecular weight organic compounds.

What is claimed is:
1. A process for the selective hydrogenation of a phenylphenol to produce a cyclohexyl phenol which comprises reacting a phenylphenol dissolved in an alkanoic acid having from 2–10 carbon atoms in the molecule in the liquid phase with molecular hydrogen in the presence of a palladium catalyst at a temperature between about 50° C. and 200° C. and a pressure between about 300 and 5,000 p.s.i.g. until sufficient hydrogen is reacted to saturate one aromatic ring of the phenylphenol and separating cyclohexyl phenol as the sole substantial product of the reaction.

2. The process of claim 1 wherein the phenylphenol is p-phenylphenol and the saturated aliphatic monocarboxylic acid is acetic acid.

References Cited
UNITED STATES PATENTS

| | | | |
|---|---|---|---|
| 3,278,611 | 10/1966 | Dewhirst et al. | 260—631 |
| 2,704,773 | 3/1955 | Young et al. | 260—618 |
| 2,847,463 | 8/1958 | Toland et al. | |
| 3,179,705 | 4/1965 | Coker et al. | 260—648 |

LEON ZITVER, *Primary Examiner.*

T. G. DILLAHUNTY, *Assistant Examiner.*

U.S. Cl. X.R.

260—618, 612; 252—52, 404, 407, 364; 44—78